United States Patent [19]
Rogers et al.

[11] 3,893,488
[45] July 8, 1975

[54] CORROSION RESISTANT GEL COATING LINING FOR COMPOSITE PLASTIC PIPE

[75] Inventors: Philip A. Rogers, Neshanic Station; Jack E. Hesse, Somerville; Joseph P. Ferraro, Scotch Plains, all of N.J.

[73] Assignee: Johns-Manville Corporation, Denver, Colo.

[22] Filed: Jan. 25, 1974

[21] Appl. No.: 436,572

Related U.S. Application Data

[63] Continuation of Ser. No. 197,397, Nov. 10, 1971, abandoned.

[52] U.S. Cl. ........... 138/141; 138/145; 138/DIG. 7; 428/36; 428/236; 428/246; 428/265; 428/287
[51] Int. Cl. ..................... B32b 15/02; D03d 13/00
[58] Field of Search ......... 161/88, 92, 94, 115, 150, 161/156, 170; 138/141, 145, DIG. 7

[56] References Cited
UNITED STATES PATENTS

| | | | |
|---|---|---|---|
| 2,598,090 | 5/1952 | Yung et al. | 161/92 |
| 2,939,200 | 6/1960 | Ewing et al. | 161/92 |
| 3,328,226 | 6/1967 | Wiley | 161/92 |
| 3,402,742 | 9/1968 | O'Brien, Jr. | 161/92 X |
| 3,470,917 | 10/1967 | Grosh | 156/173 X |
| 3,488,206 | 1/1970 | Munder et al. | 138/145 X |
| 3,595,731 | 7/1971 | Davies et al. | 161/150 |
| 3,692,619 | 9/1972 | Wedekind et al. | 161/88 |

FOREIGN PATENTS OR APPLICATIONS 1,290,847   9/1972   United Kingdom............ 138/DIG. 7

Primary Examiner—George F. Lesmes
Assistant Examiner—Patricia C. Ives
Attorney, Agent, or Firm—Robert M. Krone; Stephen C. Shear

[57] ABSTRACT

An improved corrosion-resistant gel coat is provided for use in a plastic structure which may be exposed to acidic fluids after being subjected to external loading. The improved gel coat is of laminar construction and typically includes a sheet of acid-resistant fibers having a break elongation of at least 40 percent positioned adjacent the exposed surface, a layer of woven fabric having a break elongation of at least 20 percent, and a cured, acid-resistant polymeric matrix bonding the layers together in a laminar relationship and bonding the gel coat to the remainder of the structure.

14 Claims, 3 Drawing Figures

INVENTORS
PHILIP A. ROGERS
JACK E HESSE
JOSEPH P. FERRARO

BY *Robert M. Krone*

ATTORNEYS

CORROSION RESISTANT GEL COATING LINING FOR COMPOSITE PLASTIC PIPE

This is a continuation of application Ser. No. 197,3397, filed Nov. 10, 1971, which is now abandoned.

FIELD OF THE INVENTION

This invention relates to new and improved gel coat constructions for use in reinforced plastic composite structures. More particularly, the invention relates to an improved corrosion resistant gel coat for use as the inner lining in reinforced plastic composite structures, such as pipe, in which external loading of the structure creates the possibility of crazing the surface of the structure and permitting corrosive attack by acidic fluids

BACKGROUND OF THE INVENTION

Large diameter, flexible, reinforced plastic pipes are being formed by a variety of techniques, and are being commercially marketed for a variety of in-the-ground services. Typically, these reinforced plastic pipes are formed by winding resin-impregnated filaments on a removable mandrel, curing the resin-impregnated structure and removing the mandrel from the cured pipe. By appropriate selection of the filaments and the resin binder, typically glass filaments in an epoxy or polyester resin, strong structures can be fabricated which are relatively light-weight and which have a small wall thickness in relationship to their inside diameter. Further, these structures generally possess excellent corrosion resistance in an unstressed condition due to the inherent resistance to acid and alkali attack of epoxy and polyester resins, a valuable property of most synthetic resins.

Typically, a continuous, resin-rich gel coat is provided at the interior wall surface of reinforced plastic pipe that is intended to serve as a fluid barrier. In large diameter, 15–48 inch, reinforced plastic pipe presently on the market, the gel coat is typically formed by saturating a 10 mil sheet of C-glass with resin, and winding the saturated C-glass on a rotating mandrel. Upon removal of the mandrel, the gel coat forms the inner wall surface of the pipe. This gel coat functions adequately as a fluid barrier if the plastic pipe is not subjected to heavy external loading, which crazes the interior surface of the resin of the gel coat, and then subsequently exposed to acidic conditions.

When a cylindrical pipe section is subjected to external loads, for example, the weight of the fill placed over it when buried in the ground, the deformation of the external cross section is resisted by shear stresses which tend to concentrate at the interior wall surface of the pipe wall. These shear stresses, in turn, can produce craze cracking of the resin in the gel coat.

At the interior surface of the gel coat, the point of maximun strain, the gel coat of the pipe may be in direct contact with acidic or basic solutions. If the resin in the gel coat becomes cracked or crazed because of excessive strain, the glass filaments in the C-glass sheet in a conventional gel coat will be exposed to corrosive attack. Once the corrosive fluids reach these glass filaments, fluid penetration of the entire pipe wall structure can occur very rapidly and mechanical failure follows as the galss filaments which provide strength properties are weakened by corrosive attack. For example, organic materials in sewage are attacked by bacteria and other microorganisms and form acids that are capable of rapidly attacking glass filaments.

The cost of the raw materials used in reinforced plastic pipe, including those pipes which utilize alternating thin layers of filamentary material and particulate material, makes it economically impractical to minimize the crazing tendency in the gel coat by merely increasing wall thickness.

In the past, various attempts have been made to overcome the potential corrosive failure problem of plastic pipe, but these attempts have concentrated on improving the properties of the resin used in the gel coat. While varying the chemical nature of the resin and the additives used in formulating the overall resin composition have made it possible to improve the susceptibility of the resin to craze cracking to some extent, this effort has only been partially successful. Even this limited improvement can only be accomplished at a large increase in resin binder raw material costs, which tends to make such plastic pipe economically uncompetitive with pipe formed of other materials of construction.

BRIEF DESCRIPTION OF THE INVENTION

The present invention provides an improved corrosion-resistant gel coat for use as the inner lining in plastic composite structures which may have their inner wall surfaces exposed to corrosive fluids. The gel coat includes an inner layer formed by a fibrous sheet, a layer of interconnected fibers, and a cured acid-resistant polymeric matrix bonding the layers together in a laminar relationship. The inner layer is formed by a sheet having a break elongation of at least 40 percent and formed of fibers that retain at least 50 percent of their tensile strength when exposed to 60 percent $H_2SO_4$ at 70°F for 100 hours. The layer of interconnected fibers has a break elongation of at least 20 percent and is formed of fibers that retain at least 50 percent of their tensile strength when exposed to 60 percent $H_2SO_4$ at 70°F for 100 hours.

The invention, in a preferred embodiment, provides an improved corrosion-resistant gel coat for use as the exposed inner lining in reinforced plastic pipe. Such a gel coat typically includes a first inner sheet of spunbonded polyester fibers having a break elongation of at least 40 percent; a centrally-positioned layer of woven polyester fabric; and a cured polyester matrix bonding said layers together in a laminar relationship and bonding the gel coat to the remainder of the pipe structure.

Preferably, the spunbonded polyester fibers are crimped and have a break elongation of at least 100 percent and the sheets formed therefrom are perforated at regular intervals to relieve entrapped air bubbles and to aid in saturating the sheets during fabrication.

For large diameter pipes of 30–48 inches and above, the gel coat preferably includes a second sheet of spunbonded fiber and a layer of woven polyester fiber positioned between the sheets of spunbonded polyester fibers.

The improved gel coat of this invention resists the corrosive attack of externally-loaded composite plastic pipes by both reducing the craze cracking tendency at the inside wall surface of the pipe, and by providing at least two annularly disposed corrosion-resistant barriers within the pipe wall. While the fibrous layers are open and quite fluid-permeable prior to fabrication of the pipe, the fibrous layers and the polymeric matrix form continuous annularly disposed barriers to corrosive fluids. Any tendency of the polymeric matrix to crack is believed to be greatly reduced in the vicinity of the annularly disposed reinforced regions provided by the fibrous layers.

In preferred embodiments, the polymeric matrix is formed of a material that forms chemical bonds with the fiber present in the various layers. For example, strong chemical bonding can be achieved between spunbonded polyester sheets, woven polyester cloth, and polyester resin in the matrix.

By routine selection of the synthetic polymeric material used in the fibrous layers and the resin binder system, the gel coat of this invention can provide outstanding resistance to both acids and bases under conditions in which the plastic structure is externally loaded.

DETAILED DESCRIPTION OF THE INVENTION

While the gel coat of this invention is particularly advantageously used as the inner lining of a pipe product, and is described and illustrated in conjunction with a pipe product, the gel coat can be used as a liner for a variety of plastic structures, such as storage tanks which retain corrosive fluids.

The gel coat of this invention includes at least two layers of acid resistant fibers bonded together in laminar relationship by an acid-resistant resin matrix. The fibrous sheets possess a high break elongation and provide resistance to craze cracking of the resin. Although, for ease of resin impregnation into the sheets, the fibrous sheets are selected to be highly liquid-permeable, the acid-resistant fibrous sheets cooperate with the resin to form a fluid-impermeable barrier in the vicinity of the sheets.

Figure 1:
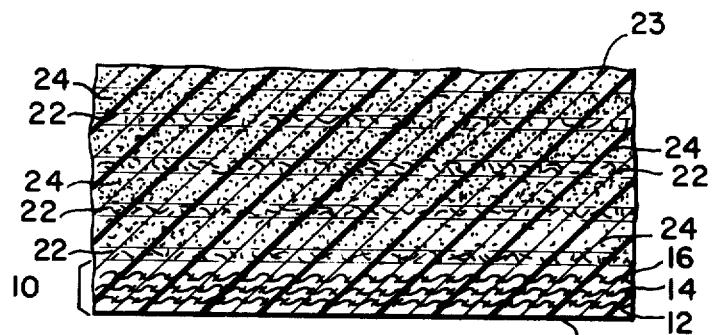
FIG. 1 is an enlarged longitudinal sectional view of the wall of a composite plastic pipe including an embodiment of the gel coat of this invention.
Figure 2:
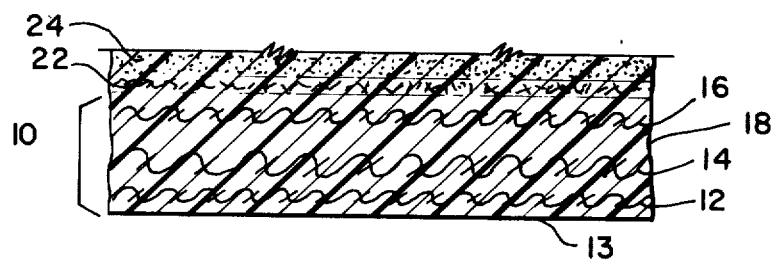
FIG. 2 is an enlarged view of the gel coat illustrated in FIG. 1.

With reference to FIGS. 1 and 2, there is illustrated an embodiment of the gel coat of this invention for use in flexible reinforced plastic pipe including alternating layers of glass filaments and particulate material. The gel coat, generally 10, includes an inner fibrous sheet 12, adjacent the inner wall surface 13 of the pipe, a layer of interconnected fibers 14, and a second fibrous sheet 16 which are each continuous and annularly disposed with relation to the axis of the pipe. A continuous cured resin matrix 18 bonds sheet 12, layer 14, and sheet 16 together in a laminar concentric relationship. Matric 18 preferably also bonds gel coat 10 to the remainder of the pipe wall construction which, as illustrated in FIG. 1 includes alternating layers 22 of glass filaments and layers 24 of particulate material (sand). The filaments and particles in layers 22 and 24 and the layers themselves are bonded together by a cured polymeric matrix.

A resin bonded layer 23 of coarse granular material forms the exterior wall surface of the pipe. The wall surface 13 that forms the inner wall surface of the pipe comprises polymeric resin binder.

The fibrous sheet used as the inner sheet 12 adjacent the corrosive fluid is selected to have a break elongation of at least 40 percent and be formed of fibers that retain at least 50 percent of their tensile strength when exposed to 60 percent $H_2SO_4$ at 70°F for 100 hours. This sheet preferably is formed of spunbonded fibers and is from 10 to about 100 mils thick and preferably about 10 mils for cost reasons.

The use of a spunbonded sheet as sheet 12 is preferred and helps provide a porous sheet having high tensile strength at a minimum thickness. A thin inner sheet or veil is desirable to provide a smooth inner wall surface for a pipe structure, and also ensures easy removal of a wound pipe from the mandrel on which such pipe is typically formed.

It is desirable to locate sheet 12 as close as possible to the inner wall 13 of the pipe to help prevent craze cracking. Usually, for mandrel wound pipe, this distance will be a few mils (usually about 0.2–0.5 mils) and is achieved by saturating sheet 12 with resin prior to winding the sheet on the mandrel to provide the thin coat of resin at the interior of the pipe.

The inner sheet should be highly permeable to liquid resin to permit easy saturation of the sheet, and also to permit removal of any air bubbles that may be entrapped during a mandrel winding, pipemaking operation. If necessary to attain the desired permeability, the sheet can be perforated, preferably by displacing rather than severing the fibers at regular intervals. For commonly used liquid resin systems, 1/32 – ⅛ inch perforations at spaced intervals of from one-fourth to one-half inch have been found desirable when using sheets of spunbonded polyester.

A variety of fibers will provide a sheet with the break elongation and acid resistance requirements for sheet 12, including polyester, polypropylene, and polyamide fibers.

A presently preferred inner sheet 12 is a spunbonded sheet of crimped polyester fibers under the trademark REEMAY. These spunbonded sheets exhibit good resistance to long term exposure to both acids and alkalis in the range of pH 0.1 to 10.0 at temperatures below 100°F, and exhibit an unusually high break elongation.

The gel coat of this invention includes a layer interconnected acid-resistant fibers having a break elongation of at least 20 percent. This layer is preferably composed of woven fibers which provide a relatively inexpensive back-up layer that further aids in preventing crazing of the gel coat resin and also provides a back-up fluid barrier. However, it should be understood that spunbonded sheets and other fiber arrangements which meet the break elongation requirement can be utilized, although they will generally be more expensive.

Woven layer of fibers 14 is preferably from 30 to 80 mils thick and provides the means for rapid build up of a gel coat of desired thickness. Synthetic yarns or staple woven in a relatively open pattern, for example, 18 picks and 18 ends, provide a preferred material for layer 14. Generally, the same synthetic organic fibers used in sheet 12 can be used in layer 14.

In a presently preferred embodiment, the woven layer 14 is formed of 1,000 1,300 denier polyester yarn.

A second layer 16 of fibrous sheet is provided in the embodiment of FIGS. 1 and 2 and is positioned adjacent the layer 14. Layer 16 can conveniently be selected to be the same fibrous sheet used in layer 12.

The synthetic resin matrix 18 is formed from the typical polymeric binder systems used in the preparation of reinforced plastic structures. Polyester and epoxy systems are preferred. The resin binder system and the fibrous layers should be selected so that chemical bonding is achieved between the fibers and the resin as the resin cures. Also, the resin binder system used to form matrix 18 should form chemical bonds with the resin used in the remainder of the reinforced plastic structure.

It is usually possible, because of the presence of the fibrous layers, to use the same basic resin binder system in the gel coat of the invention as is used in the remainder of the plastic structure. For some usages, it may be desirable to use a different resin binder system or to add flexibilizers, and/or fillers, such as aluminum silicate, to the resin used to form the matrix. The incorporation of flexibilizers at levels of up to 15 percent by weight of the resin solids improves the elongation properties of the resin, and thus tends to improve the stress-cracking tendency of the resin. The slection of a particular flexibilizer for use with a particular resin will usually be in accordance with the recommendation of the resin manufacturer.

Figure 3:
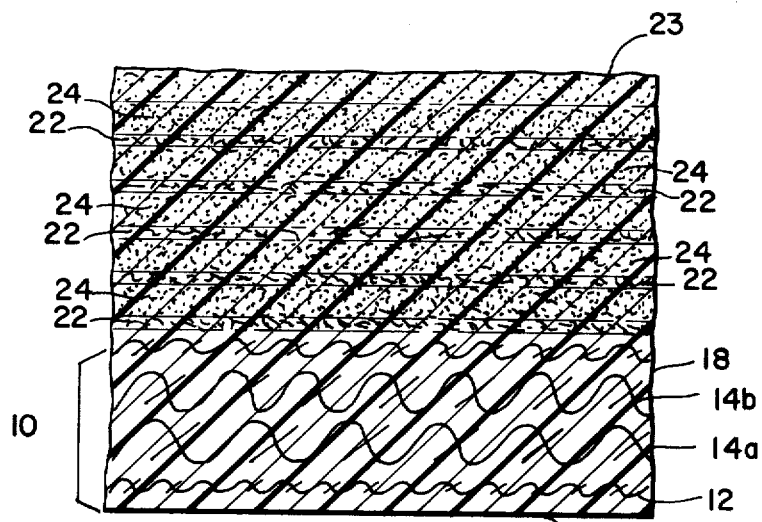
FIG. 3 is a section through another composite pipe having as an inner lining another embodiment of the gel coat of this invention.

In the embodiment illustrated in FIG. 3, the gel coat includes a pair of layers 14a and 14b of woven polyester fabric instead of a single fabric layer as shown in FIGS. 1 and 2. In other respects, the gel coat of FIG. 3, which is particularly adapted for use in large diameter (above 30-inch) pipe, is similar to the earlier described embodiments.

The preferred gel coats of this invention for use in plastic pipe have a thickness of from 30–100 mils with the lower portion of the range of thickness reflecting small diameter pipe and a two-layer construction and the upper portion of the range reflecting 30–48 inch pipe and a four-layer construction including two layers of woven fabric.

The gel coat of this invention can conveniently be formed directly on the rotating mandrel commonly used in fabricating reinforced plastic pipe. The fibrous sheet or mat used to form each of the fibrous layers is saturated with resin using a conventional technique, and then is spirally wound on the mandrel. Subsequently, the remainder of the wall structure of the plastic pipe is formed on the mandrel, cured, and the mandrel is removed from the pipe. Curing of the resin produces the desired gel coat structure.

The following examples are merely illustrative of the invention, and should not be understood as limiting the scope and principles of the invention. All percentages referred to herein are by weight unless otherwise specifically indicated.

EXAMPLES 1-4

A series of tests were made to determine the effect on sewer pipe of exposure to sulfuric acid while under strain. The interior wall surface of samples of 15-inch diameter pipe, 1 foot in length, were exposed to 1.0 N sulfuric acid while subjected to load producing strain in the samples that varied from 0.7 to 1.0 percent. The ends of the test pipe samples were blocked to retain the sulfuric acid within the pipe and prevent acid seepage and attack through the side wall of the pipe.

The test pipe sections included sections having a gel coat manufactured in accordance with the invention, and otherwise similar sections except that the gel coat was formed by saturating a 10 mil sheet of C-glass with sand-containing resin. The sections manufactured in accordance with the invention included a gel coat comprising a first 10 mil thick layer of spunbonded polyester fibers sold under the trade designation REEMAY Style 2017 by E. I. duPont de Nemours & Co. This fibrous sheet was perforated at about ½-inch intervals to form openings about one-eighth inch in diameter.

The perforated sheet is saturated with polyester resin of intermediate chemical resistance sold by Diamond Shamrock under the designation DR-315 and containing 15 percent by weight of a flexibilizer (No. 6825 sold by Diamond Shamrock). The sheet is saturated by passing it through a bucket containing the polyester resin. The bucket has a slot opening of 0.040 – .045 in the bottom. The bucket is filled with a polyester resin, and the sheet passing through the bucket is saturated with resin. The perforated sheet is then wound on a conventional rotating mandrel.

A polyester fabric (30 picks × 30 ends) woven from polyester staple of about 1,000 denier (sold by DuPont under the trademark DACRON) is fed through a coating pan containing the above-described polyester resin and squeezed out through two squeeze rolls to remove excess polyester resin. The polyester web is then wound over the polyester sheet on the rotating mandrel.

After the gel coat has been applied, a conventional pipe build up operation is performed in which alternating layers of glass fiber and sand are applied to the rotating mandrel.

In the strain tests, none of the four pipe samples constructed in accordance with the invention had failed during the duration of the tests which exceeded 594 hours, while under 0.7, 0.8, 0.9 or 1.0 percent strain. In contrast, the pipe samples having a conventional gel coat all failed within 28 hours when subjected to the same strain levels.

The results of these strain tests under corrosive conditions show that plastic pipe having the gel coat of the invention would provide outstanding service life in the ground, where the strain on the pipe is ordinarily at a considerably lower level than 0.7 percent. It has been found that 100 hours under a strain of 0.7 percent is approximately equivalent to a 50-year life in the ground under strain not exceeding 0.5 percent. Other tests have shown that time to failure of the plastic pipe under a combination of strain and acid attack is primarily related to strain. Once the conventional pipe having a C-glass veil cloth is deflected to produce a relatively low level of strain, failure usually follows relatively quickly, even at low acid concentrations (such as 0.1 N).

EXAMPLES 5-8

In these examples, 30-inch plastic pipe is constructed using the general mandrel winding procedure outlined above. The gel coat contains four layers—a first inner layer comprising a 10 mil sheet of spunbonded crimped polyester, second and third layers comprising a woven fabric (9 picks and 12 ends) formed of three-ply polyester yarn of 1,300 denier, and an outer layer, adjoining the alternating layers of glass fiber and sand, of 10 mil spunbonded crimped polyester. The resin and the saturation technique used correspond to that described above for Examples 1–4.

One-foot length samples of the 30-inch pipe are subjected to external loading to produce 0.7, 0.8, 0.9 and 1.0 percent strains and subjected to 1.0 N sulfuric acid. None of the samples failed during the 410 hour duration of the test.

What is claimed is:

1. An improved corrosion resistant gel coat for use as an exposed inner lining in reinforced plastic sewer pipe, comprising:
   a cylindrical inner layer formed by a spunbonded polyester fibrous sheet, said sheet having a break elongation of at least 40 percent and formed of fibers that retain at least 50 percent of their tensile strength when exposed to 60 percent $H_2SO_4$ at 70°F for 100 hours;
   an adjacent cylindrical layer of woven polyester fabric, said adjacent layer having a break elongation of at least 20 percent and formed of fibers that retain at least 50 percent of their tensile strength when exposed to 60 percent $H_2SO_4$ at 70°F for 100 hours; and
   a cured acid resistant polymeric matrix encasing said layers and bonding said layers together in a laminar relationship.

2. The gel coat of claim 1 in which the sheet is formed of crimped polyester fibers, and has a break elongation of at least 100 percent.

3. The gel coat of claim 2 in which the sheet of fibers has 1/32–⅛-inch diameter perforations at spaced intervals of from one-fourth to one-half inch to relieve entrapped air bubbles and to aid in saturating the sheets.

4. The gel coat of claim 1 including a second fibrous sheet, said second sheet positioned outwardly and in laminar relationship with respect to said layer of woven fabric.

5. The gel coat of claim 1 having a thickness of from 40 to 100 mils.

6. An improved corrosion resistant gel coat for use as the exposed inner lining in reinforced plastic sewer pipe comprising:
   a first cylindrical inner sheet of spunbonded polyester fibers;
   a cylindrical layer of woven polyester fabric; and
   a cured acid resistant polymeric matrix encasing said sheet and said layer and bonding said sheet and said layer together in a laminar relationship and bonding the gel coat to the remainder of the pipe structure.

7. The gel coat of claim 6 in which the thickness of said sheet is 10–40 mils and the thickness of said layer is 30–80 mils.

8. The improved corrosion resistant gel coat of claim 6 further including a second sheet of spunbonded polyester fibers, each sheet having a break elongation of at least 100 percent with said layer positioned between said first and second sheets.

9. The gel coat of claim 6 in which the spunbonded polyester fibers are crimped and have a break elongation of at least 100 percent.

10. The gel coat of claim 6 in which the first inner sheet has 1/32–⅛ inch diameter perforations at spaced intervals of from one-fourth to one-half inch to relieve entrapped air bubbles and to aid in saturating the sheets.

11. The gel coat of claim 8 having a thickness of from 40–100 mils.

12. The gel coat of claim 8 in which the spunbonded sheets have a thickness of from 10 to 40 mils and the woven polyester fabric is formed of 1,000 to 1,300 denier yarn.

13. The gel coat of claim 8 including a second layer of woven polyester fiber positioned between said sheets of spunbonded polyester fibers.

14. A composite plastic pipe, comprising:
   a cylindrical body portion comprising reinforced plastic material; and
   a cylindrical corrosion resistant gel coat located concentrically within and against said body portion so as to provide an inner liner for said body portion, said gel coat including
   a cylindrical inner layer comprising a sheet of spunbonded polyester fibers,
   a cylindrical layer of woven polyester fabric located radially outwardly from said inner layer, and a cured polyester matrix bonding said layers together in a laminar relationship and bonding the gel coat to said body portion.

* * * * *

UNITED STATES PATENT AND TRADEMARK OFFICE
CERTIFICATE OF CORRECTION

PATENT NO. : 3,893,488
DATED : July 8, 1975
INVENTOR(S) : Rogers, et al

It is certified that error appears in the above—identified patent and that said Letters Patent are hereby corrected as shown below:

Column 1, line 4, Serial No. "197,3397" should read --197,397--

Column 1, line 67, "galss" should read --glass--

Column 4, line 66, "1000, 1,300 should read --1000 to 1300 --

Column 5, line 23, "slection" should read --selection--

Column 6, line 18, "0.040 - .045" should read -- 0.040" (inches) - .045"

Signed and Sealed this twenty-first Day of October 1975

[SEAL]

Attest:

RUTH C. MASON
*Attesting Officer*

C. MARSHALL DANN
*Commissioner of Patents and Trademarks*